United States Patent
Van De Sluis et al.

(10) Patent No.: US 9,820,356 B2
(45) Date of Patent: Nov. 14, 2017

(54) METHODS AND APPARATUS FOR CREATING DIRECTIONAL LIGHTING EFFECTS

(71) Applicant: PHILIPS LIGHTING HOLDING B.V., Eindhoven (NL)

(72) Inventors: Bartel Marinus Van De Sluis, Eindhoven (NL); Philip Steven Newton, Eindhoven (NL); Tim Dekker, Eindhoven (NL); Bram Knaapen, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/034,603

(22) PCT Filed: Nov. 10, 2014

(86) PCT No.: PCT/IB2014/065923
§ 371 (c)(1),
(2) Date: May 5, 2016

(87) PCT Pub. No.: WO2015/071816
PCT Pub. Date: May 21, 2015

(65) Prior Publication Data
US 2016/0278186 A1     Sep. 22, 2016

Related U.S. Application Data

(60) Provisional application No. 61/904,869, filed on Nov. 15, 2013.

(51) Int. Cl.
*F21V 21/00*     (2006.01)
*H05B 37/02*     (2006.01)
(Continued)

(52) U.S. Cl.
CPC ..... *H05B 37/0227* (2013.01); *F21V 23/0442* (2013.01); *H05B 33/0854* (2013.01);
(Continued)

(58) Field of Classification Search
CPC .............. H05B 33/0869; F21V 23/0442
(Continued)

(56) References Cited

U.S. PATENT DOCUMENTS 6,016,038 A     1/2000   Mueller et al.
6,211,626 B1    4/2001   Blackwell et al.
(Continued)

FOREIGN PATENT DOCUMENTS

CN     101346082 A    1/2009
CN     201513771 U    6/2010
(Continued)

*Primary Examiner* — Thuy Vinh Tran
(74) *Attorney, Agent, or Firm* — Akarsh P. Belagodu

(57) ABSTRACT

Disclosed is a lighting fixture (10) that illuminates a presentation object or surface. The lighting fixture includes a first member (18) that at least partially surrounds or encompasses the presentation object and has a plurality of LED-based light sources (12) which can create a variety of lighting effects based on one or more characteristics of the presentation object. The lighting fixture further has a sensor (34) that detects a characteristic of the presentation object, and a controller (26) connected to the sensor such that, as a result of the individual addressability of the LED-based light sources, create or modify a directional lighting effect based on the detected characteristic.

18 Claims, 10 Drawing Sheets

(51) Int. Cl.
*H05B 33/08* (2006.01)
*F21V 23/04* (2006.01)
*F21W 131/405* (2006.01)
*F21Y 105/10* (2016.01)
*F21Y 115/10* (2016.01)

(52) U.S. Cl.
CPC ..... *H05B 33/0863* (2013.01); *H05B 33/0869* (2013.01); *H05B 33/0872* (2013.01); *H05B 37/0218* (2013.01); *H05B 37/0245* (2013.01); *H05B 37/0272* (2013.01); *F21W 2131/405* (2013.01); *F21Y 2105/10* (2016.08); *F21Y 2115/10* (2016.08)

(58) Field of Classification Search
USPC ............... 315/149; 362/249.02, 257, 249.06, 362/296.05, 311.06, 317
See application file for complete search history.

(56) References Cited

U.S. PATENT DOCUMENTS 8,068,225 B2 * 11/2011 Van De Sluis ......... A47F 3/001
356/402

8,779,681 B2 * 7/2014 Adler ....................... F21S 2/00
315/291

| | | |
|---|---|---|
| 2005/0265024 A1 | 12/2005 | Luk |
| 2007/0263388 A1 | 11/2007 | Lai et al. |
| 2010/0053975 A1 | 3/2010 | Liu et al. |
| 2012/0306381 A1 | 12/2012 | Adler |
| 2012/0326612 A1 | 12/2012 | Kirsten |

FOREIGN PATENT DOCUMENTS

| | | |
|---|---|---|
| JP | 2007003569 A * | 1/2007 |
| JP | 2007003569 A | 1/2007 |
| JP | 2008078066 A | 4/2008 |
| JP | 2011222411 A | 11/2011 |
| SE | 201200428 A1 | 10/2012 |
| WO | WO2007072376 A2 | 6/2007 |
| WO | WO2008029323 A1 | 3/2008 |
| WO | WO2008029352 A1 | 3/2008 |
| WO | WO2010092412 A1 | 8/2010 |
| WO | WO2011132787 A1 | 10/2011 |
| WO | WO2014009277 A1 | 1/2014 |

* cited by examiner

METHODS AND APPARATUS FOR CREATING DIRECTIONAL LIGHTING EFFECTS

CROSS-REFERENCE TO PRIOR APPLICATIONS

This application is the U.S. National Phase application under 35 U.S.C. §371 of International Application No. PCT/IB2014/065923, filed on Nov. 10, 2014, which claims the benefit of U.S. Provisional Patent Application No. 61/904,869, filed on Nov. 15, 2013. These applications are hereby incorporated by reference herein.

TECHNICAL FIELD

The present invention is directed generally to directional lighting effects. More particularly, various inventive methods and apparatus disclosed herein relate to a lighting fixture with a plurality of individually-addressable LED-based light sources that facilitate directional illumination over an object from multiple angles.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

It is often desirable to illuminate an object to create a pleasing presentation of consumer products, ornamentation, sculptures, artwork, or other types of objects that can be found, for example, in museums, art galleries, retail environments, hotels, and in homes, among other places. Directional lighting effects are used in many applications in which a presentation object or scene, or a specific portion of the object or scene, is intentionally accentuated or emphasized with light.

For example, spotlights are typically used to create directional lighting effects on presentation objects. These spotlights are often permanently installed or are provided by mechanically movable lighting fixtures. These existing spotlight systems are limited and inflexible, making it difficult to create dynamic light effects or illuminate an object from multiple sides, particularly in a coordinated fashion. In many spotlight systems, numerous light sources must be installed separately and must be connected and commissioned in order to be controlled as a single system to provide directional lighting effects. For example, circular lighting fixtures in the shape of a ring are used as an accessory for a camera to illuminate a subject. These circular lighting fixtures, however, provide very limited range of lighting effects.

Thus, there is a need in the art to provide a lighting fixture with a plurality of individually-addressable LED-based light sources that can create dynamic lighting effects that illuminate a presentation object from multiple angles.

SUMMARY

The present disclosure is directed to inventive methods and apparatus for illuminating and accentuating a presentation object using directional lighting effects. In view of the foregoing, various embodiments and implementations are directed to a circular lighting fixture includes a plurality of individually-addressable LED-based light sources which can be configured to provide dynamic lighting effects from multiple angles over a presentation object, for example, an object disposed centrally with respect to the LED-based light sources. The lighting effects may be tailored to one or more characteristics or attributes of such centralized presentation object, and/or can be based on external characteristics, stimuli, or environment. The circular lighting fixture can also include a sensor to detect a physical characteristic of the centralized presentation object and/or location of the viewer and, as a result of the individual addressability of the LED-based light sources, create or modify one or more directional lighting effects created by the lighting fixture.

Generally, in one aspect, the invention relates to a lighting fixture configured for in illuminating an object or surface. In various embodiments, the lighting fixture includes substantially circular member including a plurality of LED-based light sources and defining a central region, where each of said plurality of LED-based light sources is individually addressable, and where the plurality of LED-based light sources are configured to create one or more of a plurality of lighting effects. The lighting fixture also includes a sensor that measures a parameter of an object placed within the central region, and a controller that is operably connected between the sensor and the plurality of individually addressable LED-based light sources. The controller is configured to control one or more of the plurality of individually addressable LED-based light sources to result in one of the plurality of lighting effects, where the resulting lighting effect is based at least in part on the determined parameter of the object.

In some embodiments, the lighting fixture further includes a second substantially circular member with a second plurality of individually addressable LED-based light sources. In some aspects, the second substantially circular member at least partially encompasses the first substantially circular member.

In some embodiments, the first substantially circular member is flexible. In some embodiments, the first substantially circular member is at least partially embedded in a surface.

Generally, in one aspect, a lighting system is configured to illuminate an object. The lighting system includes a lighting fixture with (i) a substantially circular member having a plurality of individually addressable LED-based light sources configured to create one or more of a plurality of lighting effects; (ii) a communications module; and a controller connected to the communications module and the plurality of individually addressable LED-based light sources. The lighting system also includes a user device that has a sensor configured to determine a parameter of an object placed within the center of the circular member. The controller of the lighting fixture is configured to control the plurality of individually addressable LED-based light sources to result in one of the possible lighting effects, with the resulting lighting effect based at least in part on the determined parameter of the object.

In some embodiments, the user device is a handheld computing device such as a smart phone.

Generally, in one aspect, a method for illuminating an object using a lighting fixture is provided, where the lighting fixture includes: (i) a substantially circular member with a plurality of individually addressable LED-based light sources configured to create a plurality of lighting effects; (ii) a sensor configured to determine a parameter of an object placed near the circular member; and (iii) a controller connected between the sensor and the plurality of individually addressable LED-based light sources, where the controller is configured to control one or more of the plurality of individually addressable LED-based light sources to result in one of the plurality of lighting effects. The method further includes the steps of receiving, by the controller, information from the sensor regarding the parameter, and creating one or more of the plurality of lighting effects based at least in part on the received information.

In some embodiments, the method further the includes steps of receiving, by the controller, updated information from the sensor regarding the parameter, and modifying the created lighting effect based at least in part on the received updated information.

Generally, in one aspect, a method for illuminating an object includes the steps of: (a) providing a lighting fixture, the lighting fixture including: (i) a first member comprising a plurality of LED-based light sources and defining a central region, wherein each of the plurality of LED-based light sources is individually addressable, and further wherein the plurality of LED-based light sources are configured to create one or more of a plurality of lighting effects; (ii) a sensor configured to determine a parameter of an observer located in proximity to the lighting fixture; and (iii) a controller operably connected between the sensor and the plurality of individually addressable LED-based light sources, wherein the controller is configured to control one or more of the plurality of individually addressable LED-based light sources to result in one of the plurality of lighting effects; (b) receiving, by the controller, information from the sensor regarding the parameter; and (c) creating one or more of the plurality of lighting effects based at least in part on the received information. The parameter can be, for example, a location of the observer.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It is often desirable to illuminate an object with a spotlight having directional lighting effects in order to intentionally accentuate or emphasize a presentation object or scene, or a portion of the object or scene. However, spotlights are typically permanently installed or are provided by mechanically movable lighting fixtures, resulting in lighting systems that are limited and inflexible. Further, numerous light sources must be installed separately and then must be connected and commissioned in order to be controlled as a single system to provide directional lighting effects.

More generally, Applicants have recognized and appreciated that it would be beneficial to provide a lighting fixture with a plurality of individually-addressable LED-based light sources that can create dynamic lighting effects to illuminate a presentation object. For example, a circular lighting fixture with multiple light sources can accommodate and illuminate a presentation object that is placed within the central region of that lighting fixture.

In view of the foregoing, various embodiments and implementations of the present invention are directed to a circular lighting fixture includes a plurality of individually-addressable LED-based light sources which can be configured to provide dynamic lighting effects specific to a centralized presentation object. As a result of the dynamic lighting effects, the centralized presentation object having a variety of heights, sizes, and shapes can be exhibited. The circular lighting fixture can also include a sensor to detect a physical characteristic of the centralized presentation object and, as a result of the individual addressability of the LED-based light sources, create or modify one or more directional lighting effects created by the lighting fixture.

Figure 1A:
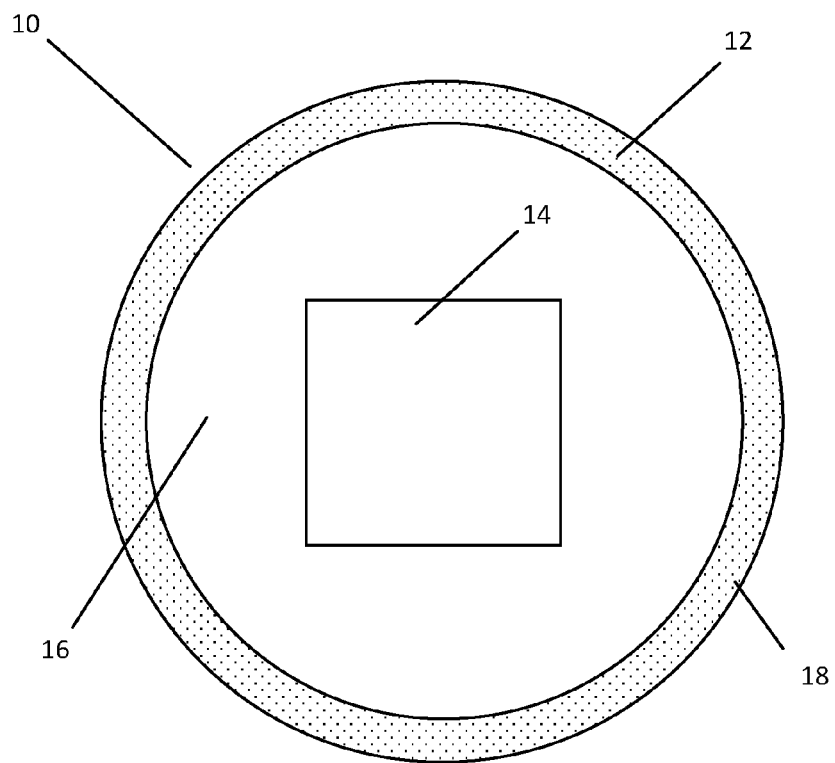
FIGS. 1A and 1B are schematic representations of a lighting fixture in accordance with an embodiment of the invention.
Figure 1B:
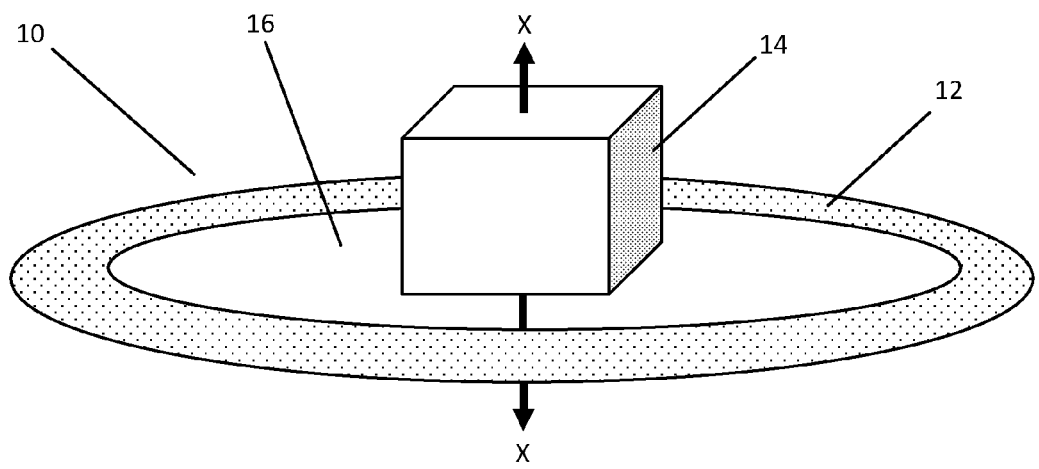

Referring now to the drawings, in FIGS. 1A and 1B there is shown one embodiment of a lighting fixture 10 including a plurality of light sources 12, at least some of which are oriented to illuminate a presentation object 14. In some embodiments, the lighting fixture 10 is at least partially circular, and the presentation object 14 is located within a central region 16 of the lighting fixture, for example aligned with the central axis X-X, shown in FIG. 1B, which is approximately 90° relative to the plane of the ring, although many other angles and orientations are possible. In some embodiments each of the plurality of light sources 12 are LED-based light sources. The LED-based light source may have one or more LEDs, including an array of LEDs in a linear, two-dimensional, or three-dimensional configuration. The light source can be driven to emit light of a predetermined character (i.e., color intensity, color temperature, etc.). Many different numbers and various types of light sources (all LED-based light sources, LED-based and non-LED-based light sources alone or in combination, etc.) adapted to generate radiation of a variety of different colors may be employed in the lighting fixture. For example, in some embodiments, lighting fixture 10 includes LEDs of two or more different colors. Accordingly, spatial orientation of the light sources may also result in adjustment of the color or color temperature of emitted light.

Figure 2:
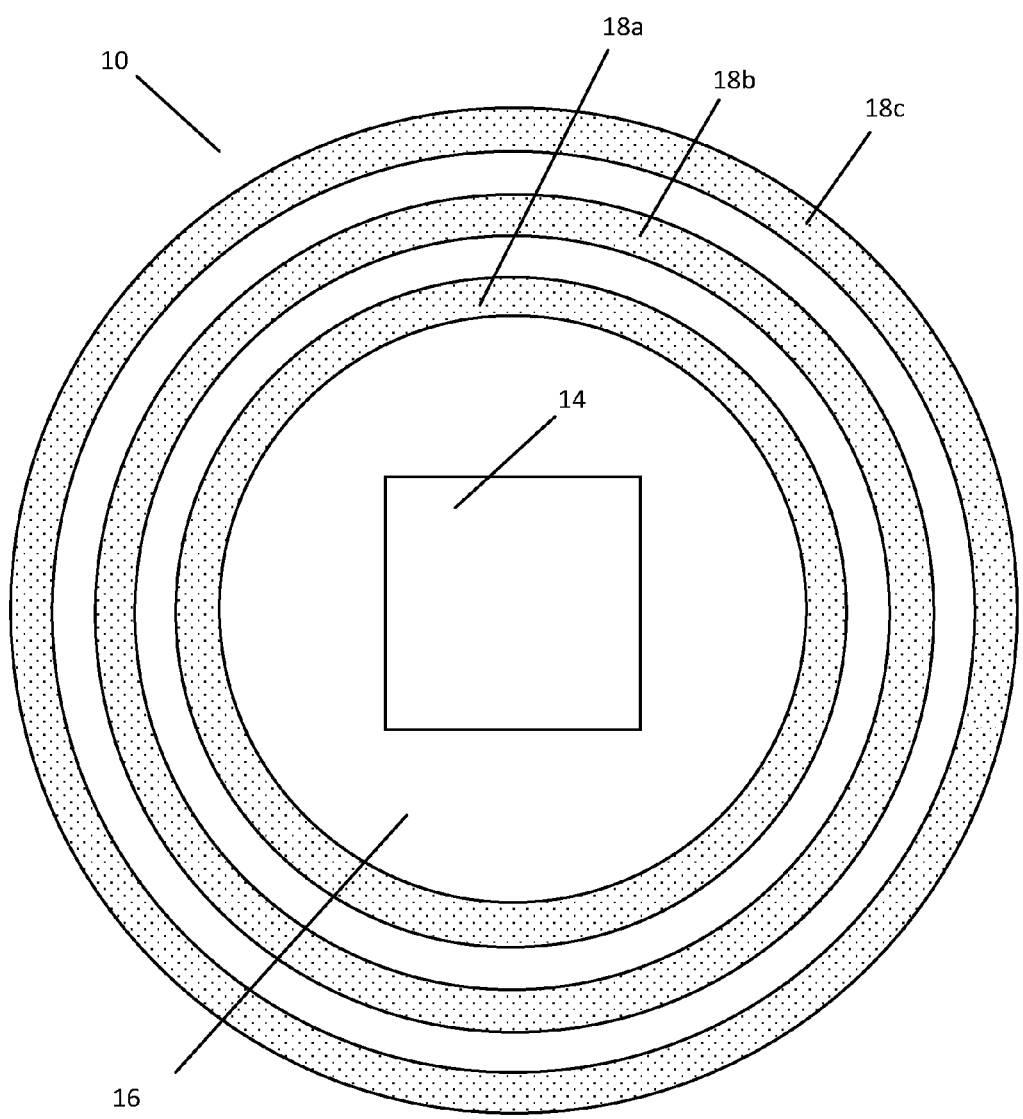
FIG. 2 is a schematic representation of a lighting fixture in accordance with an embodiment of the invention.
Figure 6:
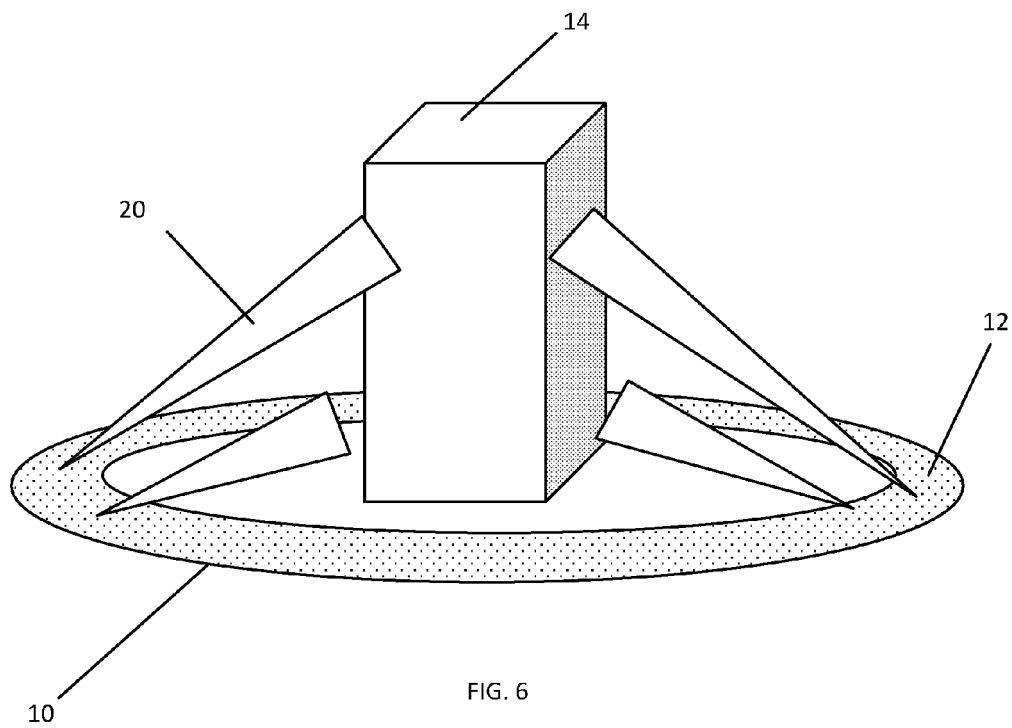
FIG. 6 is a schematic representation of a lighting fixture in accordance with an embodiment of the invention.

In the embodiment illustrated in FIGS. 1A and 1B, the lighting fixture 10 has a first member 18, such as a "ring" 18 of LED-based light sources 12, although the lighting fixture 10 may have many more rings, or may have alternative structures. For example, in the embodiment illustrated in FIG. 2, the lighting fixture 10 has three rings (18a, 18b, and 18c) of LED-based light sources 12. In this embodiment, the plurality of light sources 12 in each ring can be oriented to emit a light beam 20 (shown in FIG. 6) at a different height or location along presentation object 14. As just one example, the light sources in ring 18a could be configured to illuminate a lower portion of presentation object 14, since these light sources will be closest to the object. The light sources in ring 18b could be configured to illuminate a central or intermediate portion of presentation object 14, and the light sources in ring 18c could be configured to illuminate an upper portion of presentation object 14, since these light sources will be furthest from the object.

Figure 3:
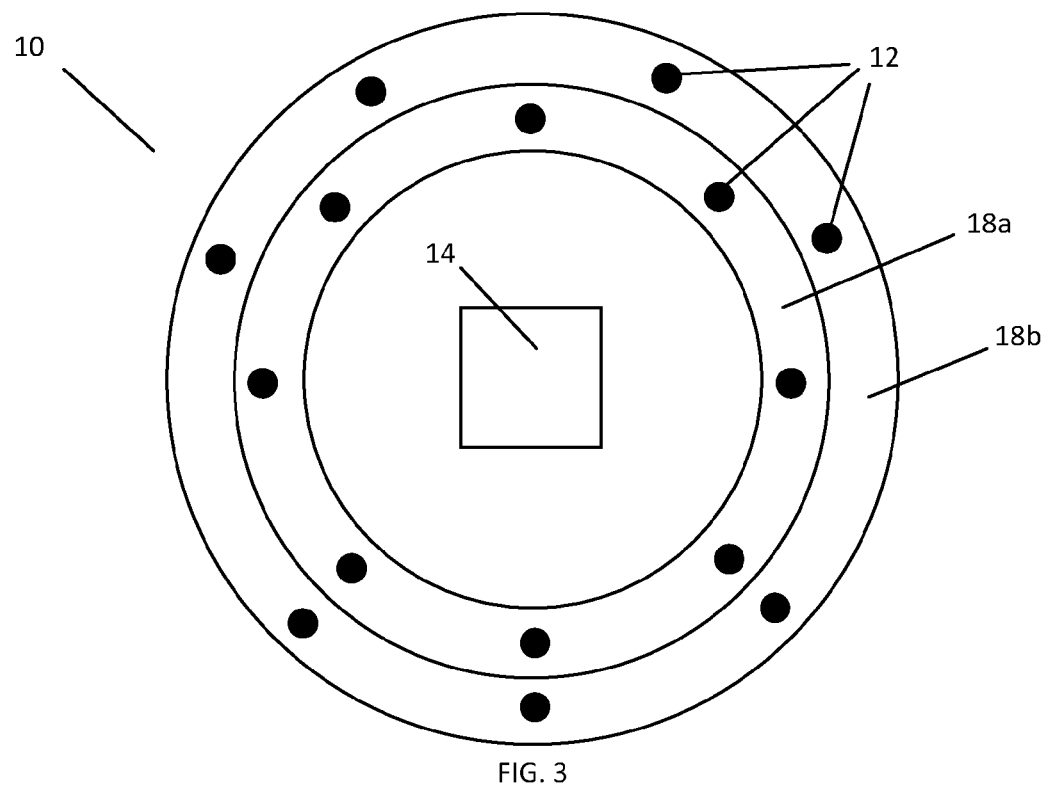
FIG. 3 is a schematic representation of a lighting fixture in accordance with an embodiment of the invention.

The LED-based light sources 12 can be distributed within lighting fixture 10 in many different configurations. For example, as illustrated in FIG. 3, the light sources 12 can be placed equidistantly, as are the light sources on ring 18a. In an embodiment with multiple rings, the light sources 12 can be coordinated between rings. For example, as illustrated in the upper half of FIG. 3, the light sources 12 in ring 18b can be staggered from the light sources in ring 18a. As shown in the lower half of FIG. 3, the light sources in ring 18b can align with the light sources in ring 18a to form rows of light sources that extend outwardly from the center region. In another embodiment, the lighting fixture 10 has a single ring 18 with light sources placed in one or more of the configurations described above. Many other configurations are possible, including combinations of configurations as depicted in FIG. 3. In one embodiment, the intensity or another characteristic of the light emitted by the light sources can change depending on the distance of that light source from the center of the lighting fixture 10. For example, the LED-based light sources 12 in the outer rings can be driven at a higher output than light sources in the inner rings.

Figure 4:
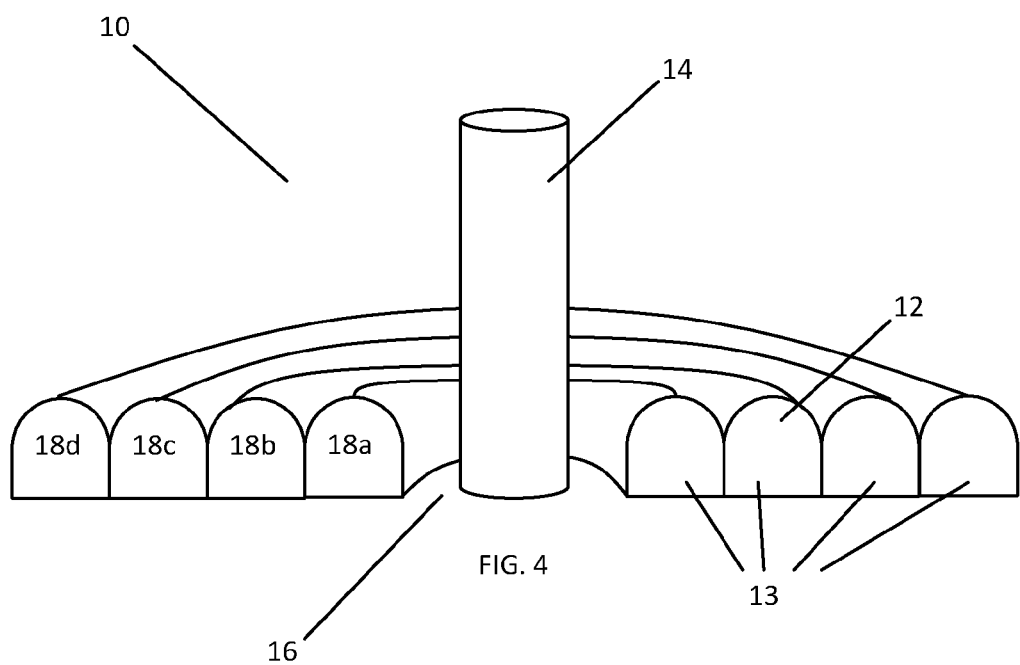
FIG. 4 is a schematic representation of cross-section of a lighting fixture in accordance with an embodiment of the invention.

Lighting fixture 10 may include one or more optical elements to optically process the radiation generated by the plurality of LED-based light sources. In some embodiments, the one or more optical elements may modify the spatial distribution or propagation direction of the generated radiation. Examples of optical elements include, but are not limited to, reflective materials, refractive materials, translucent materials, filters, lenses, mirrors, and fiber optics. The one or more optical elements may be completely or partially housed within or integrated into an enclosure or housing. In one embodiment, each LED-based light source 12 has an optical element that collimates the light emitted by that light source in a directional beam. In another embodiment, each ring 18 of lighting fixture 10 is a single optical element that collimatesthe light of every light source in or on ring 18. For example, depicted in FIG. 4 is a cross-section of a lighting fixture 10 with rings 18a, 18b, 18c, and 18d. Each of the rings includes a lenticular lens 13 along the entirety of the respective ring. In some embodiments, systems or methods can be utilized to limit or eliminate cross-talk of light.

Figure 5:
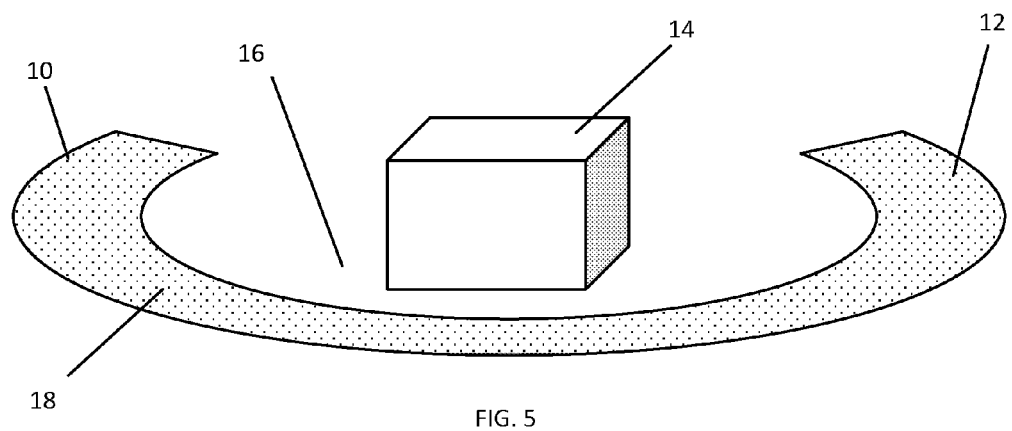
FIG. 5 is a schematic representation of a lighting fixture in accordance with an embodiment of the invention.

In various embodiments, including as illustrated in FIG. 5, the lighting fixture 10 has a semi-circular ring 18 of LED-based light sources 12 instead of an encompassing ring. This embodiment may be of particular interest when the lighting fixture abuts or is placed near a wall, corner, or other structure that prevents a full ring from being utilized. In other embodiments, the lighting structure 10 is configured in the shape of an "L", such as to accommodate a presentation object 14 in a corner, or in the shape of a "U" to accommodate, for example, a painting on a wall. The presentation object 14 can be placed within the central region 16 of the lighting fixture, and can, for example, be placed against a wall. In yet another embodiment, presentation object 14 is a vertical surface such as a wall. For example, the wall may include a mural that the user wishes to accentuate with LED-based spotlighting, and the semi-circular lighting fixture 10 is configured to provide fine-tuned directional lighting effects.

In yet another embodiment the lighting fixture 10 is a flexible circular ring. Therefore, the lighting fixture will be composed of a substantially flexible material that can adapt to a variety of different structural configurations. For example, the lighting fixture 10 or the ring 18 can be a flexible mat or other support structure that contains embedded within it the plurality of LED-based light sources 12, as well as flexible wires and/or circuitry to provide power and control to each of the light sources. A flexible lighting fixture can be utilized, for example, in an environment where a surface is not perfectly flat, and has a wide variety of other applications.

Figure 9A:
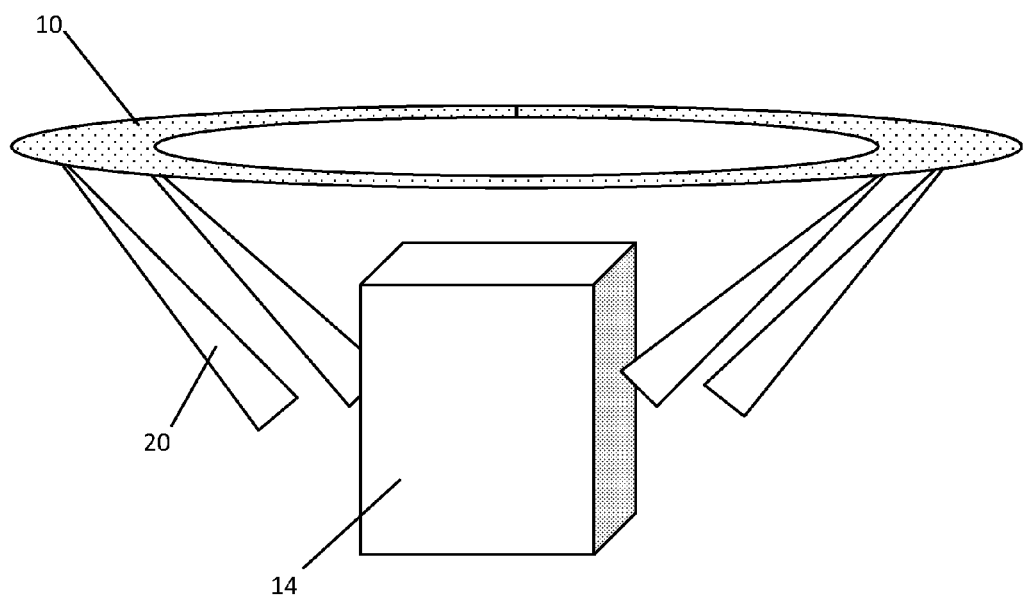
FIGS. 9A and 9B are schematic representations of a lighting fixture in accordance with an embodiment of the invention.

In another embodiment, illustrated in FIG. 9A, the presentation object 14 is placed under lighting fixture 10. For example, the lighting fixture may be affixed or connected with a ceiling, or an upper shelf or rack, or other upper surface or location, and may orient light beams 20 downward upon presentation object 14.

In yet another embodiment, any of the lighting fixtures envisioned or described herein are embedded into a surface. For example, the lighting fixture 10 in FIGS. 1A and 1B could be embedded in a surface (not shown) rather than affixed to or lying on top of the surface. As one example, the surface could be a stage, pedestal, shelf, ceiling, or other surface near which a presentation object could be placed. According to an aspect, embedding lighting fixture 10 in the surface would allow the surface to remain flat and smooth or even.

Figure 9B:
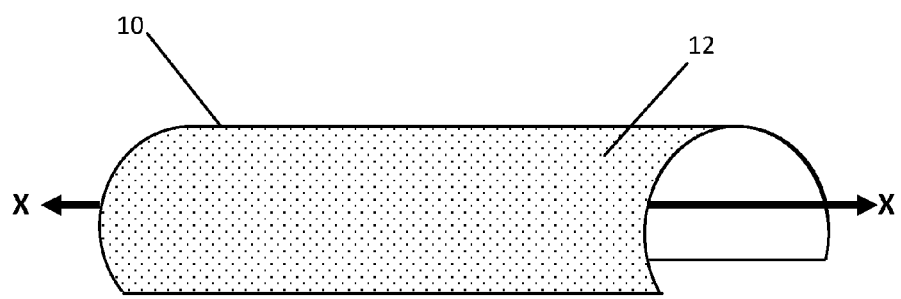

In another embodiment, the lighting fixture is a flexible tube, as illustrated in FIG. 9B, with the plurality of light sources 12 facing outwardly on the outer surface of the tube. This configuration allows for a way to position the lighting fixture 10 around an object. For example, the flexible tube could be placed on or around a tree or plant in a garden, or on the rim of a large planter or pot, among many other uses. To create a multitude of different direction lighting effects, the plurality of light sources 12 located on the exterior surface of the tube can be individually addressable and controlled.

Figure 7A:
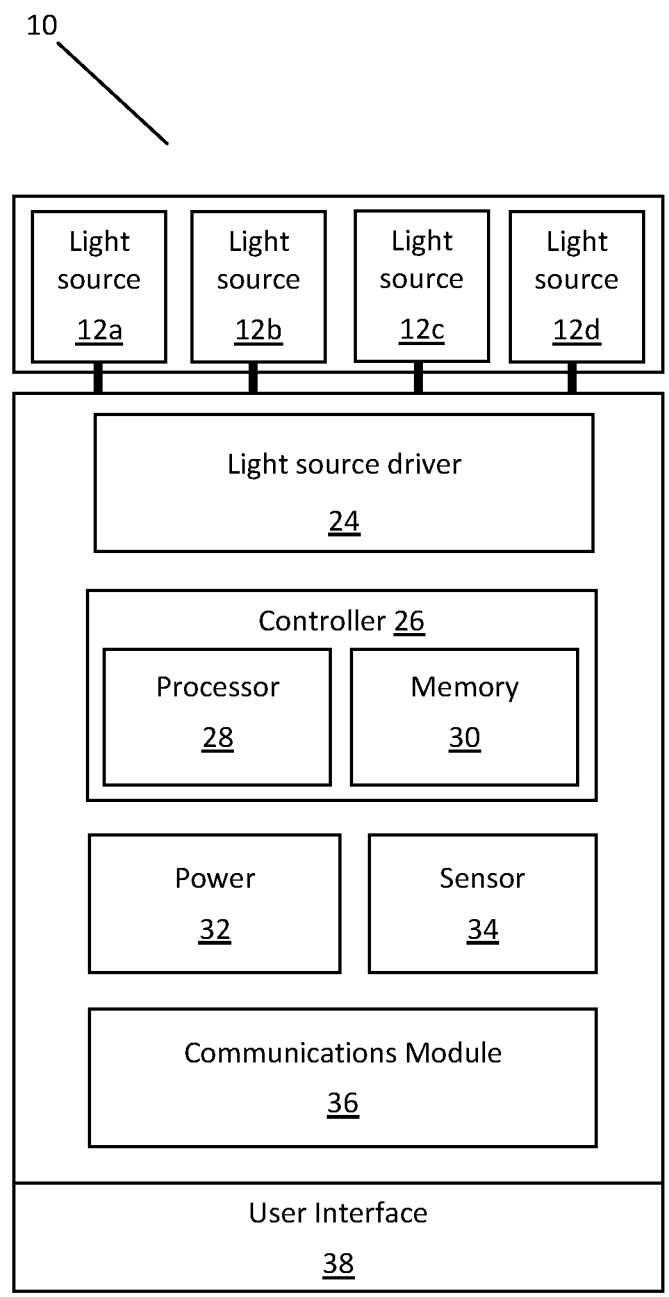
FIGS. 7A and 7B are schematic representations of a lighting fixture in accordance with an embodiment of the invention.

In one embodiment, illustrated in FIG. 7A, the lighting fixture 10 includes control circuitry 50 with one or more components, including for example a light source driver 24, controller 26 which can include a processor 28 and a memory 30, a communications module 36, and a user interface 38, among other components. In this embodiment, the lighting fixture 10 is controlled by a single controller 26, although in other embodiments the lighting fixture can have multiple controllers (26a, 26b, etc.). Controller 26 is configured or programmed to output one or more signals to drive the plurality light sources 12 and to generate varying intensities of light from the light sources. For example, controller 26 may be programmed or configured to generate a control signal for each light source to independently control the intensity of light generated by each light source, to control groups of light sources, or to control all light sources together. Controller 26 may also be configured or programmed to control one or more lighting parameters associated with the light sources 12, such as the color, color temperature, or spectral content of each light source. According to another aspect, the controller 26 may control other dedicated circuitry such as light source driver 24 which in turn controls the light sources so as to vary their intensities. Controller 26 can be, for example, a processor 28 programmed using software to perform various functions discussed herein, and can be utilized in combination with a memory 30. The memory can store data, including one or more lighting commands or software programs for execution by the processor 28, as well as various types of data including but not limited to specific identifiers for that lighting fixture.

In various embodiments the plurality of LED-based light sources 12 in lighting fixture 10 are individually addressable or controllable by controller 26. As an example, one or more characteristics of presentation object 14, such as height, color, shape, or albedo, can change or be variable over time. In one embodiment, the lighting fixture 10 includes several sensors 34 in communication with controller 26 each configured to measure the albedo, or reflecting power, of a portion of the surface of presentation object 14. As the albedo of a portion of presentation object 14 decreases, or a new presentation object 14 is placed within the central region 16, the sensor 34 detects the decrease and sends that data to controller 26. Controller 26 is configured to individually increase the intensity of a subset of the light sources 12 that are directed at that portion of the surface of presentation object 14 in order to maintain a predetermined level of reflected light from all surfaces of presentation object 14. As another example, the controller 26 receives information from an optical sensor 34, such as a camera, that presentation object 14 has moved or adopted a new shape that necessitates a change in the pattern of light sources 12 illuminating the object. Controller 26 can individually control only those light sources 12 within lighting fixture 10 that must be activated or otherwise modified in order to suitably illuminate presentation object 14.

Lighting fixture 10 also includes a source of power 42 (shown, for example, in FIG. 7A), most typically AC power, although other power sources are possible including DC power sources, solar-based power sources, or mechanical-based power sources, among others. The power source may be in operable communication with a power source converter that converts power received from an external power source to a form that is usable by the lighting fixture.

Lighting fixture 10 can also include one or more sensors 34 adapted to detect one or more characteristics of the presentation object 14, including but not limited to height, size, orientation, color, and others. In another embodiment, sensor 34 may be an ambient light sensor adapted to detect an ambient light level of the environment. For example, the ambient light level sensor 34 can detect the level of light proximal to the presentation object 14, and the controller 26 can control the intensity of light emitted by one or more light sources 12 depending on the detected ambient light level. Accordingly, sensor 34 can be a variety of different types of sensors, including optical sensors and ambient light sensors. Lighting fixture 10 is coupled to sensor 34 via a local connection and receives sensor values from the sensor 34. In some embodiments the sensor 34 may be mounted on the lighting fixture 10 or integrated with the lighting fixture 10. In some embodiments the connection between the sensor 34 and the lighting fixture 10 is a wired connection. In some embodiments the connection between the sensor 34 and the lighting fixture 10 is a wireless connection.

In some embodiments, the controller 26 may provide lighting control commands based on input or data received from one or more sensors 34. For example, in some embodiments the lighting fixture 10 may be coupled to a sensor that provides information about the height of the presentation object 14 located in the center of the ring, and thus the lighting fixture may provide lighting control commands to light source driver 24 to activate and/or deactivate certain of the plurality of light sources 12 in order to illuminate the entirety of the object. In some embodiments, the lighting fixture 10 may be coupled to an ambient light level sensor to detect the levels of ambient light in the room, in which case the lighting fixture 10 may provide lighting control commands to light source driver 24 requesting light sources 12 to operate at a certain level based on the sensed light levels.

In another embodiment, the LED-based light source can have an integrated or connected sensor to detect one or more properties of the object such that the light effect can be adjusted based on the sensor data. For example, the height of the object can be detected by scanning the object and detecting reflection of the emitted coded light in the sensor. There may be multiple sensors directed at one or more heights to detect the object. The sensor 34 can be, for example, one or more compact cameras may be integrated into the lighting fixture 10 and oriented toward the central region. One or more properties of the presentation object 14 can be derived using the camera(s) and image processing.

As one example of detection, the variance in reflection measured between the one or more light sources and/or sensors is to create a low resolution picture of the object, which can then be used as input to determine the effect of a certain light output of a light source on the object. If each light source consists of multiple LEDs emitting a different color spectrum, it is possible that each light source is able to emit light with varying colors or color temperature.

In some embodiments the lighting fixture 10 includes one or more user interfaces 38 which allow a user to control a variety of lighting characteristics, including ON/OFF, color, intensity, angle, setting particular identifiers for the lighting fixture, and many other lighting characteristics. In another embodiment, user interface 38 is utilized to provide controller 26 with information about the presentation object 14 located in the center of the ring, including but not limited to height, size, orientation, color, and others. Communication between the user interface and the lighting fixture may be accomplished through wired or wireless transmission. Manual control may be effected by the user via switch/control inputs disposed on the lighting fixture itself. For example, user interface 38 can be a power switch (e.g., a standard wall switch) that interrupts power to the controller 24. Lighting fixture 10 may be configured to include simple dipswitches, electronic switch buttons, or touch inputs. Dipswitches and electronic switch buttons can provide ON/OFF capabilities, or can also be configured to allow the user to adjust the intensity of the light provided by a single light source, a group of light sources, or all light sources.

In some embodiments, each of the plurality of light sources 12 is individually addressable and can be individually controlled by controller 26, thereby allowing for fine-tuning of the directional lighting effects. A user-operated device with user interaction systems or methods (e.g. a smart phone, tablet, or other portable or remote computing device) may be used to commission and/or control the lighting fixture and the individually addressable light sources. For example, NFC (Near-Field Communication) is employed in one embodiment of the invention to establish a communications channel between the lighting fixture and the remote computing device. Other communications methods include Bluetooth, Wi-Fi, IR, and several others.

For example, the user-operated device can be a smart phone or tablet with an installed software application that provides functionality to communicate with and control the lighting fixture. For example, the application can utilize the smart phone's existing communications features to communicate with the lighting fixture 10 via Wi-Fi, Bluetooth, or a variety of other methods. Once communication is established, the application can be used to gather information about the position, size, shape, color, height, or other characteristic of the presentation object 14. For example, the application can utilize a camera associated with the smart phone to visualize the presentation object 14, process that information, and send data to the lighting fixture. In this way, the application is indirectly selecting—or indirectly informing the selection of—the directional lighting effects.

In some embodiments, the application is used to directly select directional lighting effects. For example, the application may include a user interface that allows the user to modify one or more lighting characteristics for the light sources 12, including ON/OFF, color, intensity, angle, setting particular identifiers for the lighting fixture, and many other lighting characteristics.

Although the user input may directly control one or more of the light sources, including by immediate control over power to one or more components of lighting fixture 10, controller 26 may be configured or programmed to respond to the user input by activating a preprogrammed response, including executing a stored software program or utilizing the user input together with one or more other data inputs to choose which response to engage. In some embodiments, controller 26 may be programmed or configured to monitor user interface 38 and respond to user input by, for example, selecting one or more pre-programmed control signals stored in memory, selecting and executing a new lighting program from memory, or otherwise affecting the radiation generated by one or more of the light sources 12.

In some embodiments, lighting fixture 10 can utilize user input from user interface 38 in conjunction with data received from one or more sensors 34 to provide lighting control commands to light source driver 24, to select and execute a new lighting program from memory, or otherwise affecting the radiation generated by one or more of the light sources 12. For example, lighting fixture 10 may be configured to monitor user interface 38 for user input, and to monitor sensor 34 for sensor data. Controller 26 of lighting fixture 10 can utilize the user input in combination with the sensor data to control one or more of the light sources 12a, 12b, 12c and 12d in a manner similar to that discussed above.

In some embodiments, in order to communicate with a neighboring lighting fixture, or to communicate with a remotely-located commissioning device or sensor such as a smart phone or other portable computing device, the lighting fixture 10 can include a communications module 36. The communications medium employed by communications module 36 can be any of a variety of wired or wireless communication techniques, including a wired data bus, wireless RF communication, or light enabled communication such as coded visible or IR light, among other methods.

In some embodiments, lighting fixture 10 may also include a heat control mechanism such as a fan, heat sink, or other method to keep the lighting fixture and/or light sources cool and prolong their life expectancy.

In some embodiments, lighting fixture 10 includes one or more positional motors or movement mechanisms to orient lighting fixture 10 or one or more of the plurality of light sources 12 in one or more specific directions. The lighting fixture 10 may also utilize sensor data from sensor 34 in order to properly orient the light sources. For example, controller 26 can monitor sensor 34 and determine based on incoming optical signals that a presentation object 14 of height "y" has been placed within the central region 16 of the lighting fixture. Controller 26 can respond to the data by, for example, selecting one or more pre-programmed control signals stored in memory, selecting and executing a new lighting program from memory, otherwise affecting the radiation generated by one or more of the light sources 12, or by moving one or more of the plurality of light sources into an orientation that addresses the height "y" of the presentation object 14.

As another implementation, lighting fixture 10 may be movably installed in place with a possible range of motion that allows a user to manually manipulate the orientation of lighting fixture 10 or one or more of the plurality of light sources. In some embodiments, controller 26 can monitor its orientation and respond to movement by, for example, selecting one or more pre-programmed control signals stored in memory, selecting and executing a new lighting program from memory, or otherwise affecting the radiation generated by one or more of the light sources 12.

Figure 8:
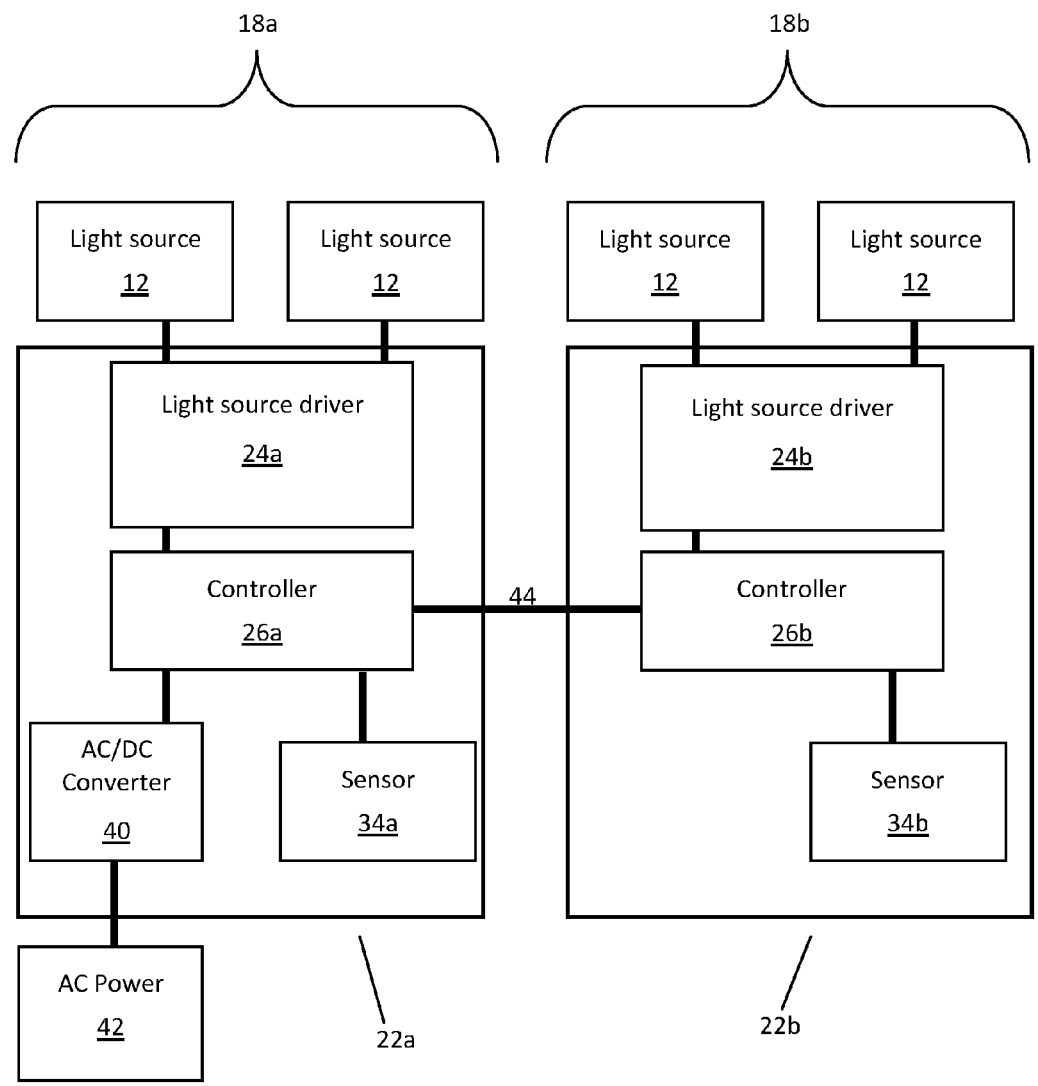
FIG. 8 is a schematic representation of a lighting fixture in accordance with an embodiment of the invention.

In some embodiments, the lighting fixture 10 includes two or more lighting units (22a, 22b, etc.), each of which includes a plurality of LED-based light sources 12. For example, in the embodiment illustrated in FIG. 8, the lighting fixture includes lighting unit 22a which forms or is a component of ring 18a, and lighting unit 22b which forms or is a component of ring 18b. Each of lighting unit 22a and 22b include a light source driver (24a, 24b) and a controller (26a, 26b). In another aspect, the plurality of lighting units are all controlled by a single controller 26, and/or a single light source driver 24. In some embodiments, one or more of the lightning units (22a, 22b, etc.) include a sensor 34. Further, the lighting fixture includes a power source 42, and a power converter 40 to provide power to the plurality of lighting units, each of which can be connected by power wiring 44. The plurality of lighting units can also include communications modules which allow individual lighting units to communicate with each other or, for example, a remote sensor.

Figure 7B:
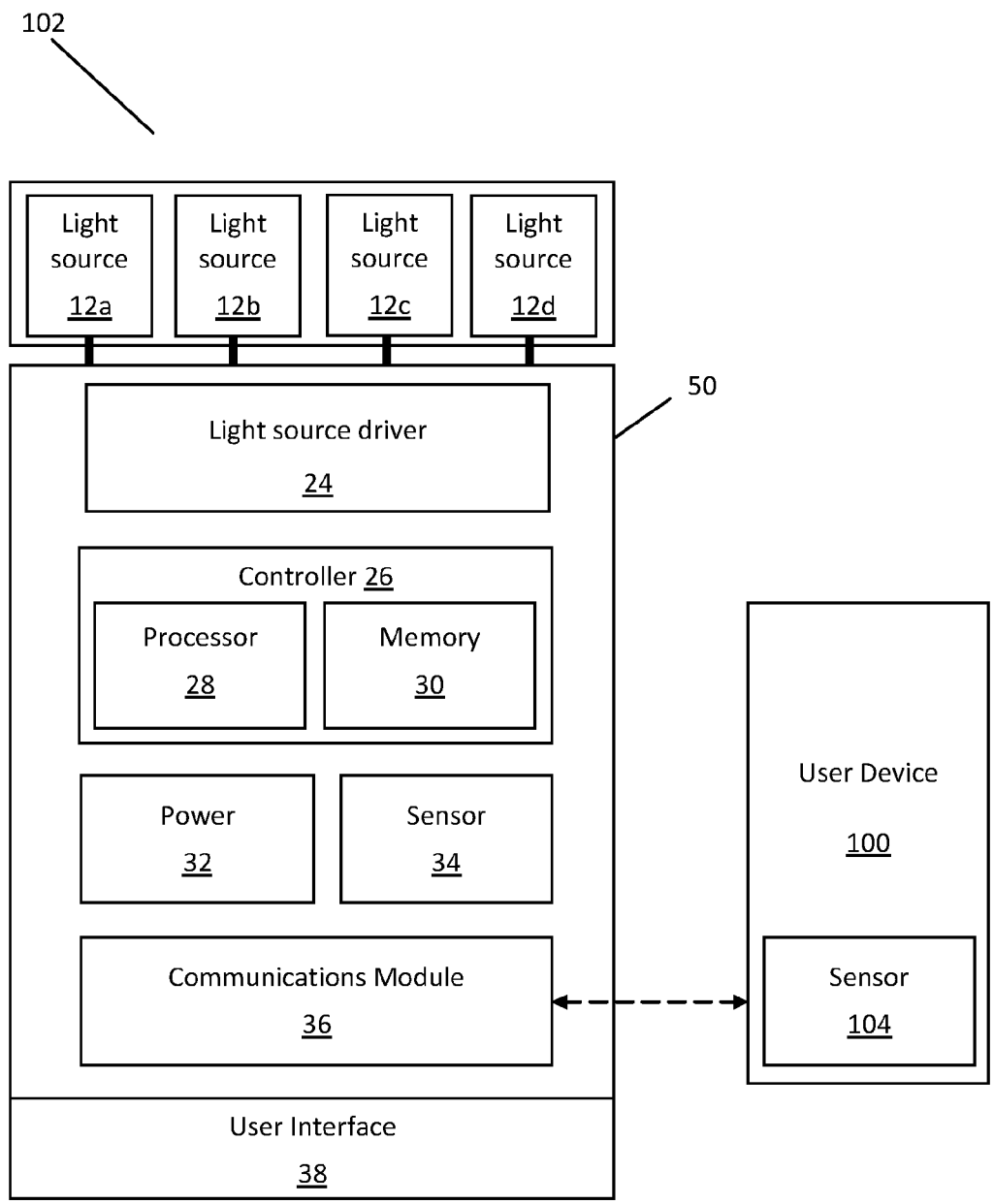

In some embodiments, a lighting system 102 includes a lighting fixture 10 and a user device 100. Referring to FIG. 7B, the lighting fixture 10 includes control circuitry 50 with one or more components, including for example a light source driver 24, controller 26 which can include a processor 28 and a memory 30, a communications module 36, and a user interface 38, among other components. In this embodiment, the lighting fixture 10 is controlled by a single controller 26, although in other embodiments the lighting fixture can have multiple controllers (26a, 26b, etc.). Controller 26 is configured or programmed to output one or more signals to drive the plurality light sources 12 and to generate varying intensities of light from the light sources. For example, controller 26 may be programmed or configured to generate a control signal for each light source to independently control the intensity of light generated by each light source, to control groups of light sources, or to control all light sources together. Controller 26 may also be configured or programmed to control one or more lighting parameters associated with the light sources 12, such as the color, color temperature, or spectral content of each light source. According to another aspect, the controller 26 may control other dedicated circuitry such as light source driver 24 which in turn controls the light sources so as to vary their intensities. Controller 26 can be, for example, a processor 28 programmed using software to perform various functions discussed herein, and can be utilized in combination with a memory 30. The memory can store data, including one or more lighting commands or software programs for execution by the processor 28, as well as various types of data including but not limited to specific identifiers for that lighting fixture.

In various embodiments the plurality of LED-based light sources 12 in lighting fixture 10 are individually addressable or controllable by controller 26. As an example, one or more characteristics of presentation object 14 or the environment surrounding either the presentation object or the lighting fixture 10 can change or be variable over time. In one embodiment, the lighting fixture 10 includes several sensors 34 in communication with controller 26 each configured to measure one or more characteristics of the presentation object, such as height or color. For example, sensor 34 can be one or more height sensor(s) oriented at different heights. Controller 26 can be configured or programmed to utilize the height sensor data to individually control one or more of the LED-based light sources 12 in order to provide uniform lighting effects along the entire height or circumference of the presentation object 14. As another example of individual control or addressability, each of ring 18a, 18b, 18c, etc. has a different collection or group of LED-based light sources of different colors. Ring 18a, or a portion of ring 18a, may have light sources that emit a certain color or range of colors. Ring 18b, or a portion of ring 18b, may have light sources that emit a different color or range of colors. The light sources of ring 18a and the light sources of ring 18b can be individually controlled in order to illuminate the presentation object 14 with certain colors, and that control may change over time in order to change the color with which the object is illuminated. For example, for a presentation object 14 on a pedestal, the controller 26 can illuminate the pedestal with light of a first intensity and color while the presentation object can be illuminated with a different intensity and color. As yet another example of individual control or addressability, the plurality of LED-based light sources 12 can be individually controlled to create lighting effects that are timed, such as associating the lighting effects with music or sound. Many other variable lighting effects can be created utilizing the individual addressability and control of the LED-based light sources 12 in lighting fixture 10.

Lighting fixture 10 can also include one or more sensors 34 adapted to detect one or more characteristics of the presentation object 14, including but not limited to height, mass, size, orientation, color, and others. In another embodiment, sensor 34 may be an ambient light sensor adapted to detect an ambient light level of the environment. Accordingly, sensor 34 can be a variety of different types of sensors, including optical sensors and ambient light sensors. Lighting fixture 10 is coupled to sensor 34 via a local connection and receives sensor values from the sensor 34. In some embodiments the sensor 34 may be mounted on the lighting fixture 10 or integrated with the lighting fixture 10. In some embodiments the connection between the sensor 34 and the lighting fixture 10 is a wired connection. In some embodiments the connection between the sensor 34 and the lighting fixture 10 is a wireless connection.

In some embodiments, the controller 26 may provide lighting control commands based on input or data received from one or more sensors 34. For example, in some embodiments the lighting fixture 10 may be coupled to a sensor 104 in user device 100 that provides information about the height of the presentation object 14 located in the center of the ring, and thus the lighting fixture may provide lighting control commands to light source driver 24 to activate and/or deactivate certain of the plurality of light sources 12 in order to illuminate the entirety of the object.

In some embodiments, each of the plurality of light sources 12 is individually addressable and can be individually controlled by controller 26, thereby allowing for fine-tuning of the directional lighting effects, including adjustments or control for height, shape, color, and many other desirable lighting effects as described above. As an example, a subset of the LED-based light sources 12 can be individually controlled to adjust the illumination of presentation object 14 based on data from sensor 34, including in response to a change in ambient light levels along a portion of the presentation object. The user device 100 can include user interaction systems and methods (e.g. a smart phone, tablet, or other portable or remote computing device), which may be used to commission and/or control the lighting fixture and the individually addressable light sources. For example, NFC (Near-Field Communication) is employed in one embodiment of the invention to establish a communications channel between the lighting fixture and the remote computing device. Other communications methods include Bluetooth, Wi-Fi, IR, and several others.

For example, the user device 100 can be a smart phone or tablet with an installed software application that provides functionality to communicate with and control the lighting fixture. For example, the application can utilize the smart phone's existing communications features to communicate with the lighting fixture 10 via Wi-Fi, Bluetooth, or a variety of other methods. Once communication is established, the application can be used to gather information about the position, size, shape, color, height, or other characteristic of the presentation object 14. For example, the application can utilize a camera associated with the smart phone to visualize the presentation object 14, process that information, and send data to the lighting fixture. In this way, the application is indirectly selecting—or indirectly informing the selection of—the directional lighting effects. In some embodiments, the application is used to directly select directional lighting effects. For example, the application may include a user interface that allows the user to modify one or more lighting characteristics for the light sources 12, including ON/OFF, color, intensity, angle, setting particular identifiers for the lighting fixture, and many other lighting characteristics.

Figure 10A:
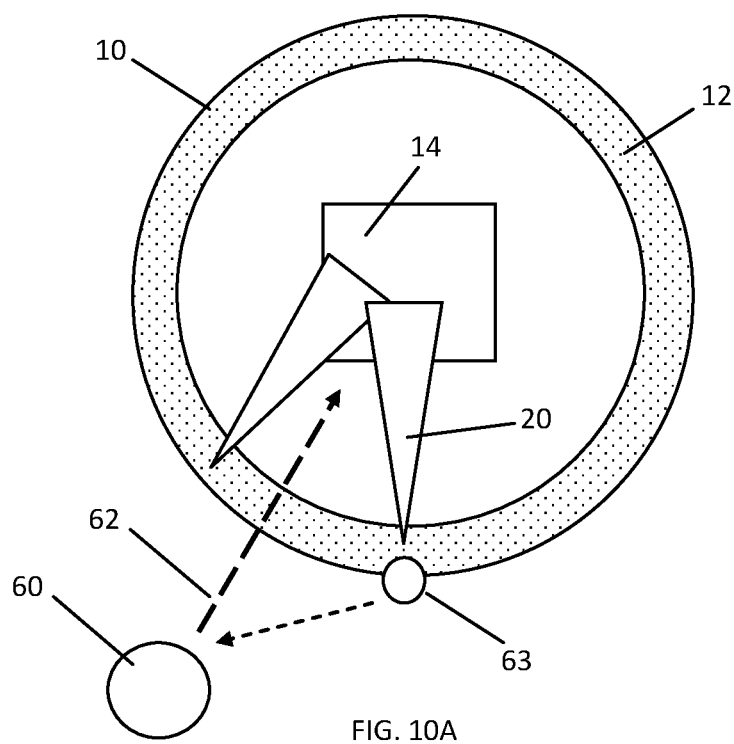
FIGS. 10A and 10B are schematic representations of a lighting fixture with adaptable lighting effects in accordance with an embodiment of the invention.
Figure 10B:
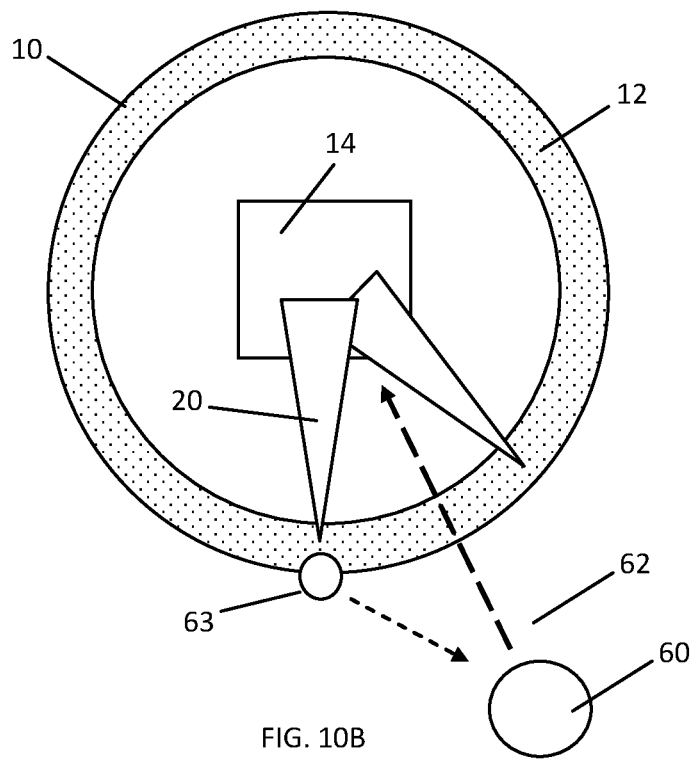

In some embodiments, illustrated in FIGS. 10A and 10B, the lighting fixture 10 responds to the location of an observer in relation to the presentation object 14. For example, in FIG. 10A, an observer 60 is located in a first position with a line-of-sight 62 of presentation object 14. Certain of the plurality of light sources 12 in the lighting fixture respond to the location of the observer and the estimated line-of-sight, as determined by a sensor 63 that monitors the environment for the presence, location, motion, and/or orientation of observers, by activating and/or deactivating, and as a result certain light beams 20 illuminate the presentation object. As the observer moves to the location in FIG. 10B, the sensor 63 detects the movement and/or new location of the observer and controller 26 uses the information to activate and/or deactivate certain light sources such that one or more different light beams 20 illuminate the presentation object. This allows for optimal illumination of the object 14 from the perspective of the viewer, as well as other interactive lighting effects. As an example, in a museum or retail location a presentation object may be displayed on a platform or stage in space where observers can freely move around the object. If the location of the observer known, then the directional lighting effect can be adjusted such that the illumination is coming from the same direction as where the observer is located (i.e., oriented with the observer's line-of-sight of the presentation object). As just one example, a single light beam 20 can be created with a direction that approximates the line-of-sight between the observer and the presentation object, or two or more beams can be created which are centered around this line. In some embodiments, other properties or information about the observer are measured and then utilized for decision-making surrounding the lighting effects. These other properties or information can include, for example, the height of the observer, among many others.

Figure 11:
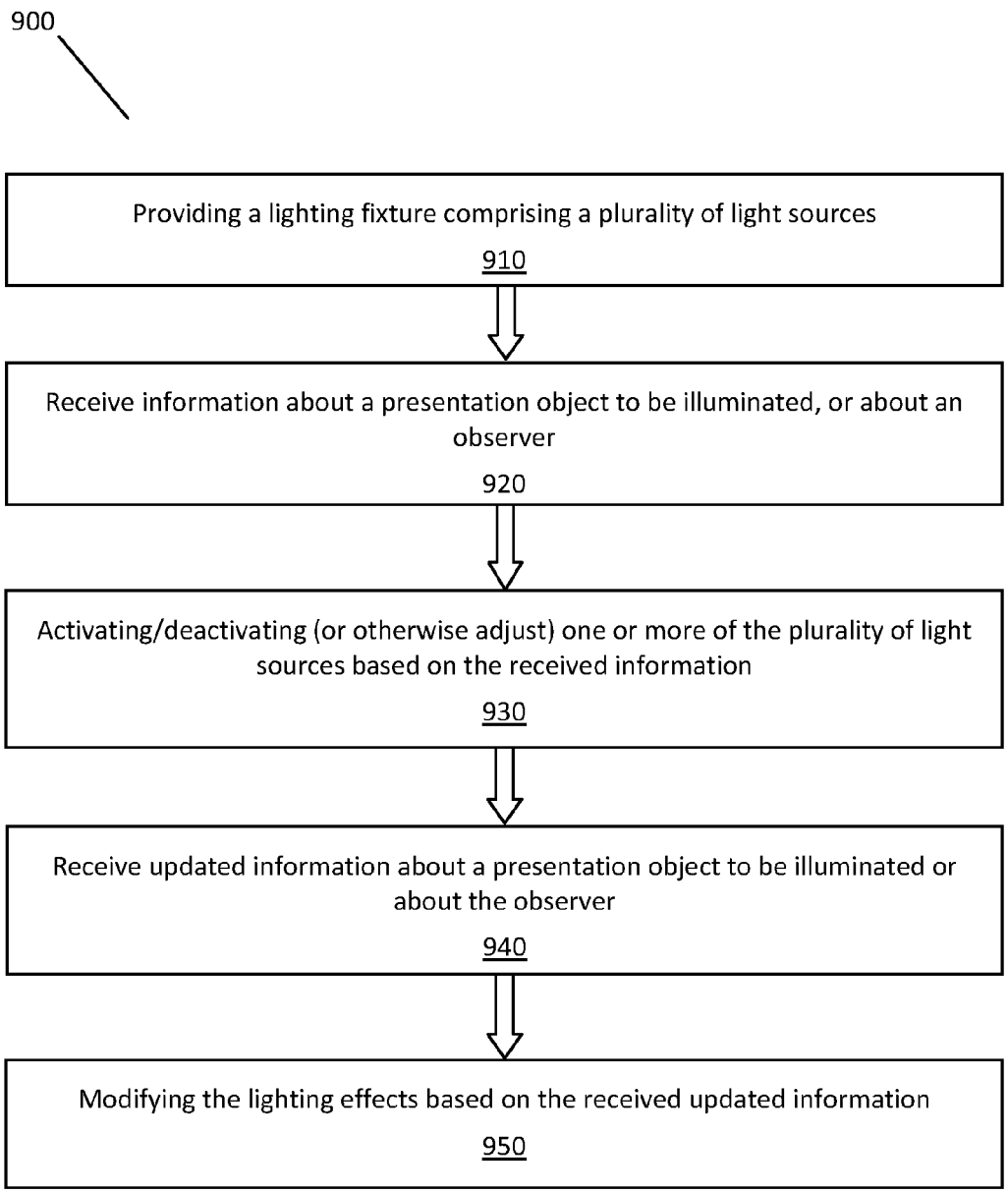
FIG. 11 is a flow chart of a method for illumination an object in accordance with an embodiment of the invention.

FIG. 11 illustrates a flow chart of an example method 900 of producing directional lighting effects of a centrally-located presentation object 14 in accordance with an embodiment. Other implementations may perform the steps in a different order, omit certain steps, and/or perform different and/or additional steps than those illustrated in FIG. 11. For convenience, aspects of FIG. 11 will be described with reference to one or more components of a lighting system that may perform the method. The components may include, for example, one or more of the components of lighting fixture 10 in FIGS. 1A-9B, and any of the embodiments described or envisioned.

In step 910, a lighting fixture 10 is provided that includes a plurality of light sources 12. The lighting fixture 10 can be any of the embodiments described herein or otherwise envisioned. For example, the lighting fixture may include a plurality of light sources 12, a controller 26 which can include a processor 28 and a memory 30, a communications module 36, and a user interface 38, among other components. Lighting fixture 10 also includes a source of power 42, most typically AC power, although other power sources are possible including DC power sources, solar-based power sources, or mechanical-based power sources, among others. Lighting fixture 10 can also include one or more sensors 34 adapted to detect one or more characteristics of the presentation object 14, including but not limited to height, mass, size, orientation, color, and others. In another embodiment, sensor 34 may be an ambient light sensor adapted to detect an ambient light level of the environment. According to another embodiment, lighting fixture 10 can include a sensor 63 configured to detect the location and/or movement of a user observing the object.

In step 920, the lighting fixture 10 receives information indicating the presence of a presentation object 14 located, placed, or moved into the central region 16 of the lighting fixture. In some embodiments, a sensor determines that the object is located within an illumination area of the lighting fixture. For example, the lighting fixture 10 can include one or more sensors to detect the presence of the object. Accordingly, the sensor can be a variety of different types of sensors, including optical sensors, light sensors, and other sensors. Lighting fixture 10 can be coupled to the sensor via a local connection and receive sensor values from the sensor. In some embodiments the sensor may be mounted on the lighting fixture 10 or integrated with the lighting fixture 10. In some embodiments the connection between the sensor and the lighting fixture 10 is a wireless connection. In some embodiments the sensor is positioned so as to provide sensor values that are relevant to the area illuminated by lighting fixture 10.

In another embodiment, at step 920 the lighting fixture 10 receives information indicating the presence of an observer of object 14 located, placed, or moved into the area near the lighting fixture. In some embodiments, a sensor 63 determines that the observer is located within a certain area of the lighting fixture. Thus, the lighting fixture 10 can include one or more sensors to detect the presence of the user. Accordingly, the sensor can be a variety of different types of sensors, including optical sensors, light sensors, and other sensors. Lighting fixture 10 can be coupled to the sensor via a local connection and receive sensor values from the sensor. In some embodiments the sensor may be mounted on the lighting fixture 10 or integrated with the lighting fixture 10. In some embodiments the connection between the sensor and the lighting fixture 10 is a wireless connection.

In some embodiments the provided lighting fixture 10 includes one or more user interfaces which allow a user to control a variety of lighting characteristics, including ON/OFF, color, intensity, angle, setting particular identifiers for the lighting unit, and many other characteristics, and allow the user to inform the lighting fixture 10 of the existence or absence of the presentation object 14 in the central region 16. Communication between the user interface and the lighting unit may be accomplished through wired or wireless transmission. Manual control may be effected by the user via switch/control inputs disposed on the lighting unit itself. Alternatively, a user-operated commissioning device with user interaction systems and methods (e.g. a smartphone, tablet, or other portable or remote computing device) may be used to commission the lighting unit.

In step 930, one or more of the plurality of light sources 12 in lighting fixture 10 are activated and/or deactivated to provide a directional lighting effect for object 14, with the activation and/or deactivation based on information received in step 920. For example, the operation and/or intensity of light emitted from one or more of the light sources 12 within lighting fixture 10 is controllable, either individually or as a single network, as described in greater detail above. In addition to activating or deactivating one or more of the plurality of LED-based light sources, other characteristics such as the intensity, color, color temperature, and angle of each of the plurality of light sources can be individually controlled. In some embodiments, one or more of the plurality of light sources 12 can be activated to illuminate object 14 with a light beam. In another aspect or configuration, such as a different shape or size of object 14, one or more of the plurality of light sources 12 can be deactivated to eliminate an existing beam of light, thereby accentuating a desired portion or region of the object. In some embodiments, the lighting fixture, one or more lighting units 22 in lighting fixture 10, and/or one or more of the plurality of light sources within the lighting fixture or lighting units can be controlled together or individually to create the desired directional lighting effects, as described in greater detail above.

In another embodiment, in step 930 one or more of the plurality of light sources 12 in lighting fixture 10 are activated and/or deactivated to provide a directional lighting effect as a result of the position or movement of the observer. For example, the operation and/or intensity of light emitted from one or more of the light sources 12 within lighting fixture 10 is controllable, either individually or as a single network, as described in greater detail above. In some embodiments, one or more of the plurality of light sources 12 can be activated to illuminate object 14 with a light beam corresponding to the line-of-sight of the user. In another aspect or configuration, such as a different shape or size of object 14, one or more of the plurality of light sources 12 can be deactivated to eliminate an existing beam of light, thereby accentuating a desired portion or region of the object. In some embodiments, the lighting fixture, one or more lighting units 22 in lighting fixture 10, and/or one or more of the plurality of light sources within the lighting fixture or lighting units can be controlled together or individually to create the desired directional lighting effects, as described in greater detail above.

In other embodiments, an angle of illumination of one or more of the plurality of light sources is adjusted based on the presence of the presentation object 14, and/or based on a detected or known characteristic or property of the presentation object 14. For example, if the presentation object is known to be—or is determined to be using sensor data—of a certain height, size, color, etc., the lighting unit 10 can adjust an angle of one or more of the light sources in order to create the desired directional lighting effect(s). Accordingly, in some embodiments, the angle of light emitted by one or more of light sources 12 in lighting fixture 10 can be adjusted. For example, the lighting fixture itself can be movable, the lighting fixture can include movable lighting units 22, or the lighting fixture can include movable light sources 12, among other ways of adjusting the angle of emitted light in lighting fixture 10. The angle of emitted light can be adjusted manually or automatically based on user input or sensor data as described above or otherwise envisioned.

As an example, the angle of one or more of the LED-based light sources 12 can be adjusted in order to create dynamic effects and accommodate objects of various sizes and heights. For example, the top of a taller presentation object will be further away from the light sources, so the beam width may be larger at the area where the emitted light shines on the presentation object, which results in a lower light intensity on the upper region of the object. To achieve a more uniform light distribution across the presentation object, the light beams generated at the outer ring can be individually driven with a higher light output or have adjusted optics such that they have a smaller beam angle. For example, the smallest possible beam angle for the outer ring can be utilized while the inner ring utilizes same beam angle at a lower intensity and density. In this way a variety of objects can be accommodated while still achieving similar lighting effects. The required beam angle may depend on the maximum size of the presentation object to be illuminated, the distance between the ring 18 or light source 12 and the presentation object, and/or the diameter of the lighting effect on the presentation object. Accordingly, there may be a direct relationship between the size of the lighting fixture 10 and the maximum size of the presentation object that can be illuminated.

In optional step 940, the lighting fixture receives updated information about the presentation object or the environment which may necessitate a modification of the existing lighting effects. As an example, the lighting fixture can be configured to illuminate the presentation object 14 based the detected position of an observer near the lighting fixture, and the resulting deduced line-of-sight of that detected observer, as shown in FIGS. 10A and 10B. As the observer moves in reference to the presentation object, the lighting fixture can adjust the lighting effects based on that movement and the user's new line-of-sight.

Upon receiving the new location information, the lighting fixture 10 can adjust one or more directional lighting effects in step 950. For example, as the observer moves to a new location, the sensor detects the movement and/or new location of the observer and controller 26 uses the information to activate and/or deactivate certain of the light sources such that one or more different light beams 20 illuminate the presentation object. This allows for optimal illumination of the object 14 from the perspective of the viewer, as well as other interactive lighting effects. As just one example, a single light beam 20 can be created with a direction that approximates the line-of-sight between the observer and the presentation object, or two or more beams can be created which are centered around this line. In some embodiments, other properties or information about the observer are measured and then utilized for decision-making surrounding the lighting effects. These other properties or information can include, for example, the height of the observer, among many others.

In another embodiment, the lighting fixture 10 includes a controller 26 which is configured or programmed to respond to the new input by activating a preprogrammed response, including executing a stored software program or utilizing the input together with one or more other data inputs to choose which response to engage.

While several inventive embodiments have been described and illustrated herein, those of ordinary skill in the art will readily envision a variety of other systems and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting fixture configured to illuminate an object, the lighting fixture comprising:
   a first member comprising a plurality of LED-based light sources and defining a central region, wherein each of said plurality of LED-based light sources is individually addressable, and further wherein the plurality of LED-based light sources are configured to create one or more of a plurality of lighting effects, wherein the first member comprises a circular member and the plurality of LED-based light sources are disposed along the circular member;
   a sensor configured to determine a parameter of an object placed at least partially within the central region; and
   a controller operably connected between said sensor and said plurality of individually addressable LED-based light sources, wherein said controller is configured to control one or more of said plurality of individually addressable LED-based light sources to result in one of said plurality of lighting effects, wherein said resulting lighting effect is based at least in part on the determined parameter of said object, wherein the plurality of lighting effects comprises a dynamic directional lighting effect, and wherein an angle of illumination of one or more of said plurality of LED-based light sources is individually controllable.

2. The lighting fixture of claim 1, further comprising a second member comprising a second plurality of LED-based light sources, wherein each of said second plurality of LED-based light sources is individually addressable.

3. The lighting fixture of claim 2, wherein said second member at least partially surrounds the first member and comprises a second circular member.

4. The lighting fixture of claim 1, wherein said sensor comprises at least one of an optical sensor and a light sensor.

5. The lighting fixture of claim 1, wherein the plurality of LED-based light sources and the plurality of resulting lighting effects are configured to illuminate the object within the central region.

6. The lighting fixture of claim 1, wherein at least one of said plurality of individually addressable LED-based light sources comprises an optical element.

7. The lighting fixture of claim 1, wherein said first member is flexible.

8. The lighting fixture of claim 1, wherein said first member is at least partially embedded in a surface.

9. The lighting fixture of claim 1, wherein said parameter is at least one of height of the object, size of the object, shape of the object, and a location on the object.

10. The lighting fixture of claim 1, further comprising wherein the plurality of LED-based light sources are disposed in a pattern along the first member.

11. A method for illuminating an object, the method comprising the steps of:
   providing a lighting fixture, the lighting fixture comprising: (i) a first member comprising a plurality of LED-based light sources and defining a central region, wherein each of said plurality of LED-based light sources is individually addressable, and further wherein the plurality of LED-based light sources are configured to create one or more of a plurality of lighting effects, wherein the first member comprises a circular member and the plurality of LED-based light sources are disposed along the circular member; (ii) a sensor configured to determine a parameter of an object placed within the central region; and (iii) a controller operably connected between said sensor and said plurality of individually addressable LED-based light sources, wherein said controller is configured to control one or more of said plurality of individually addressable LED-based light sources to result in one of said plurality of lighting effects, and wherein said plurality of lighting effects comprises a dynamic directional lighting effect;
   receiving, by said controller, information from said sensor regarding said parameter; and
   creating one or more of said plurality of lighting effects based at least in part on said received information and adjusting an angle of illumination of one or more of said plurality of LED-based light sources.

12. The method of claim 11, further comprising the steps of:
   receiving, by said controller, updated information from said sensor regarding said parameter; and
   modifying said created lighting effect based at least in part on said received updated information.

13. The method of claim 11, wherein said parameter is at least one of height of the object, size of the object, shape of the object, and a location on the object.

14. The method of claim 11, wherein said sensor is at least one of an optical sensor and a light sensor.

15. A method for illuminating an object, the method comprising the steps of:
   providing a lighting fixture, the lighting fixture comprising: (i) a first member comprising a plurality of LED-based light sources and defining a central region, wherein each of said plurality of LED-based light sources is individually addressable, and further wherein the plurality of LED-based light sources are configured to create one or more of a plurality of lighting effects in said central region, wherein the first member comprises a circular member and the plurality of LED-based light sources are disposed along the circular member; (ii) a sensor configured to determine a parameter of an observer located in proximity to the lighting fixture; and (iii) a controller operably connected between said sensor and said plurality of individually addressable LED-based light sources, wherein said controller is configured to control one or more of said plurality of individually addressable LED-based light sources to result in one of said plurality of lighting effects, the plurality of lighting effects comprising a dynamic directional lighting effect;
   receiving, by said controller, information from said sensor regarding said parameter; and
   creating one or more of said plurality of lighting effects based at least in part on said received information and adjusting an angle of illumination of one or more of said plurality of LED-based light sources.

16. The method of claim 15, further comprising the steps of:

receiving, by said controller, updated information from said sensor regarding said parameter; and modifying said created lighting effect based at least in part on said received updated information.

17. The method of claim 15, wherein said parameter is a location of the observer.

18. The method of claim 15, wherein the sensor is a distance sensor.

* * * * *